United States Patent
Slagel et al.

(10) Patent No.: US 9,363,938 B1
(45) Date of Patent: Jun. 14, 2016

(54) STRIP-TILL ROW APPARATUS

(71) Applicants: Donald Slagel, Fairbury, IL (US); Mark Slagel, Strawn, IL (US)

(72) Inventors: Donald Slagel, Fairbury, IL (US); Mark Slagel, Strawn, IL (US)

( * ) Notice: Subject to any disclaimer, the term of this patent is extended or adjusted under 35 U.S.C. 154(b) by 0 days.

(21) Appl. No.: 14/926,208

(22) Filed: Oct. 29, 2015

(51) Int. Cl.
| | |
|---|---|
| *A01B 61/04* | (2006.01) |
| *A01B 63/32* | (2006.01) |
| *A01B 49/02* | (2006.01) |
| *A01B 29/04* | (2006.01) |

(52) U.S. Cl.
CPC ............. *A01B 61/046* (2013.01); *A01B 29/048* (2013.01); *A01B 49/027* (2013.01); *A01B 63/32* (2013.01)

(58) Field of Classification Search
CPC ...... A01B 29/048; A01B 29/06; A01B 35/16; A01B 63/00; A01B 63/008; A01B 63/10; A01B 63/32; A01B 49/027
USPC ............ 111/139, 62, 66, 84, 142; 172/4, 150, 172/166, 583, 668, 540
See application file for complete search history.

(56) References Cited

U.S. PATENT DOCUMENTS

| | | | |
|---|---|---|---|
| 4,560,011 A | 12/1985 | Peterson et al. | |
| 4,834,189 A | 5/1989 | Peterson et al. | |
| 5,133,414 A | 7/1992 | Youngkrantz | |
| 5,303,780 A | 4/1994 | Evenson | |
| 5,333,559 A | 8/1994 | Hodapp et al. | |
| 5,341,754 A | 8/1994 | Winterton | |
| 5,390,745 A | 2/1995 | Harden | |
| 5,590,721 A | 1/1997 | Van Mill | |
| 5,685,245 A * | 11/1997 | Bassett | A01B 63/114 111/62 |
| 6,068,061 A * | 5/2000 | Smith | A01B 49/027 172/139 |
| 6,382,114 B1 | 5/2002 | Lanpher | |
| 6,431,287 B1 | 8/2002 | Ramp | |
| 6,896,068 B2 | 5/2005 | Dietrich, Sr. et al. | |
| 7,575,066 B2 * | 8/2009 | Bauer | A01B 5/12 172/166 |
| 7,861,660 B2 * | 1/2011 | Martin | A01C 5/06 111/140 |
| 8,839,726 B2 | 9/2014 | Van Buskirk et al. | |
| 8,910,581 B2 * | 12/2014 | Bassett | A01C 23/022 111/121 |
| 2011/0036602 A1 | 2/2011 | Bassett | |
| 2012/0255475 A1 * | 10/2012 | Mariman | A01C 7/205 111/149 |
| 2013/0032363 A1 * | 2/2013 | Curry | A01C 7/205 172/4 |
| 2015/0053433 A1 | 2/2015 | Kovach et al. | |
| 2015/0156962 A1 * | 6/2015 | Zemenchik | A01B 79/005 172/1 |

\* cited by examiner

*Primary Examiner* — John G Weiss
(74) *Attorney, Agent, or Firm* — Dale J. Ream

(57) ABSTRACT

A strip-till row apparatus includes a primary frame having spaced apart side panels each having an upstanding front edge and an opposed upstanding rear edge. A tillage assembly is operatively coupled to the primary frame adjacent the rear edges thereof and configured to contact a ground service so as to prepare the soil. An auxiliary frame includes an upstanding front wall and a mounting arm extending rearwardly from the front wall, the auxiliary frame having a linking member having a first end pivotally coupled to the front wall and a second end coupled to the primary frame. A selectively inflatable airbag includes a top coupled to the mounting arm and a bottom coupled to the linking member via an airbag mounting bracket. A relative downward force is applied to the primary frame as the airbag is selectively inflated or deflated, respectively.

14 Claims, 19 Drawing Sheets

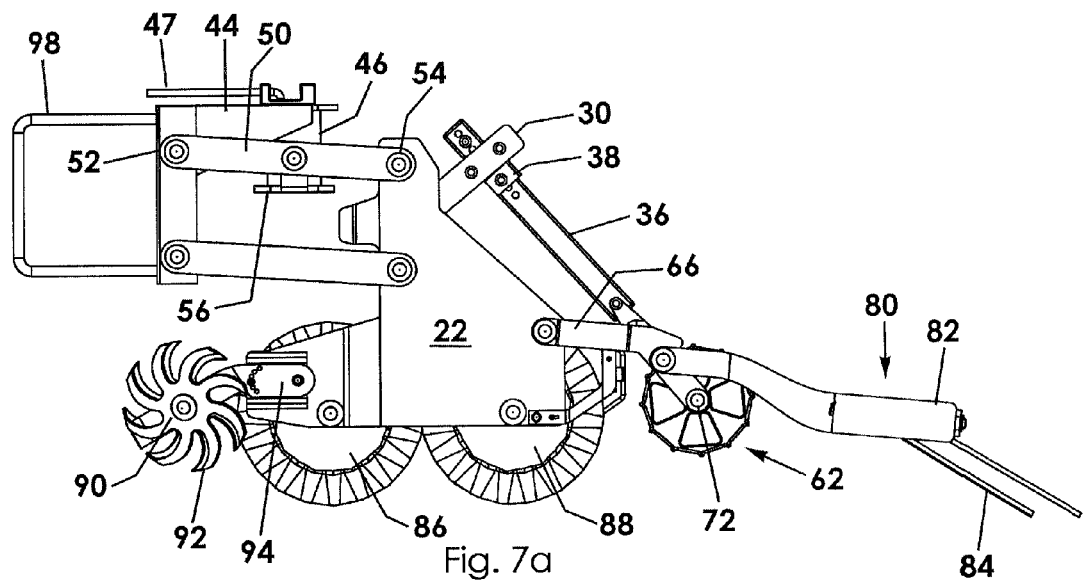
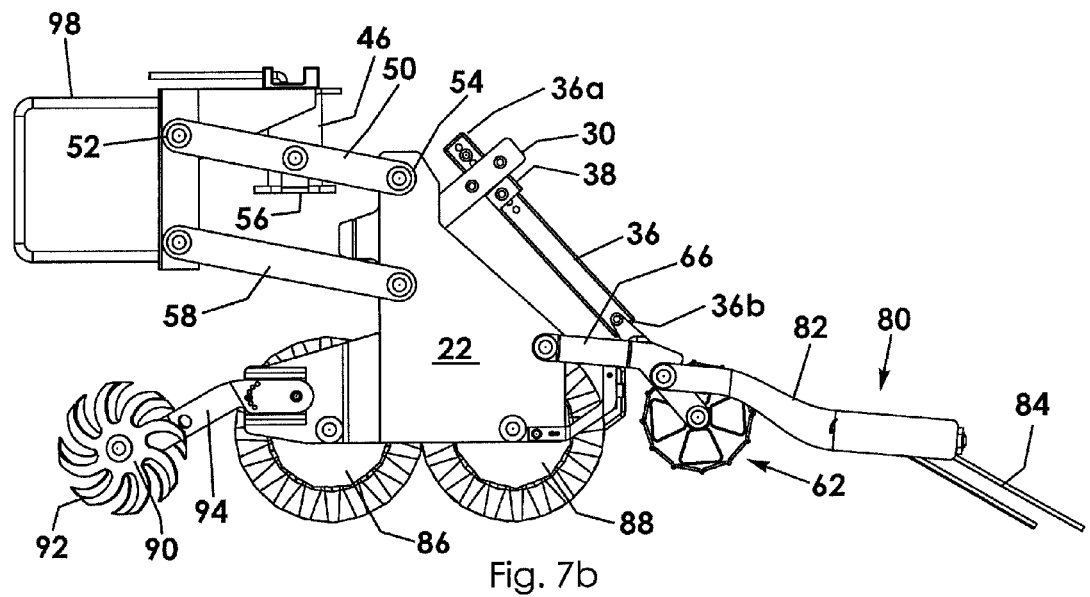

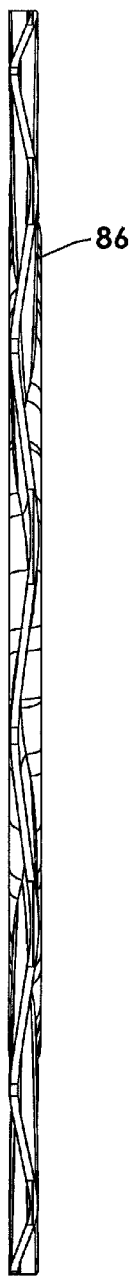
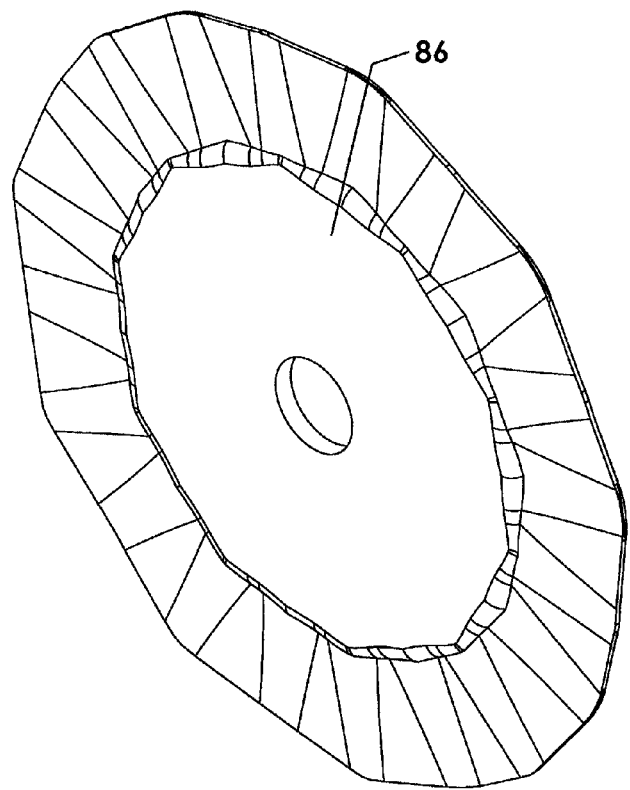
Fig. 12a
Fig. 12b

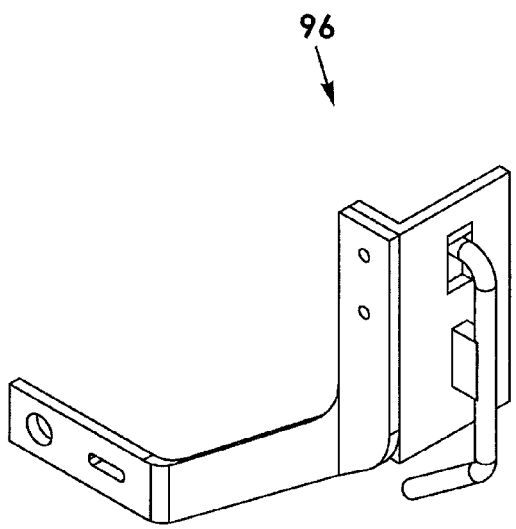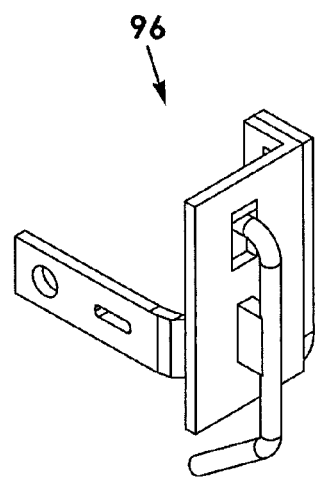
Fig. 20a
Fig. 20b

STRIP-TILL ROW APPARATUS

BACKGROUND OF THE INVENTION

This invention relates generally to farm equipment of a type for ground preparation and, more particularly, to a strip-till row apparatus for preparing the soil for the subsequent planting of seeds.

Strip tillage, or just strip-till, refers to a method or program of minimal tillage of the soil in which only the area corresponding to where the seed crop is to be planted is tilled. By contrast, conventional tillage involves tilling the entirety of the soil of a field rather than just the rows where see is to be planted. Frequently, a farm implement may include multiple individual "row units" that may be pulled across a ground surface by a tractor and which may condition the soil along the yet-to-be-planted rows to be ready to receive the seeds. Strip tillage may include means for breaking up the soil, such as with disks having teeth and then smoothing it out with the tines of a harrow, Various strip-till row devices are known in the art for preparing soil for row crop planting. Although presumably effective for their intended purposes, the existing units are often not fully efficient and thorough in that portions of the strip-till device may be lifted off the ground or at least not maintained at a consistent depth as a result of uneven ground. In other words, the existing devices have no mechanism for pressing the tillage assembly downwardly while in use.

Therefore, it would be desirable to have a strip-till row apparatus that includes an inflatable airbag configured to apply a selectable amount of downward pressure on a tillage assembly so as to maintain the tillage assembly in engaging the ground. Further, it would be desirable to have a strip-till row apparatus having a full complement of varied tillage components for sequentially conditioning the soil for planting.

SUMMARY OF THE INVENTION

A strip-till row apparatus for preparing soil for planting according to the present invention includes a primary frame having a pair of spaced apart side panels, each side panel having a generally upstanding front edge and an opposed upstanding rear edge, the primary frame having a cross brace extending between the pair of side panels. A tillage assembly is operatively coupled to the primary frame adjacent the rear edges thereof, the tillage assembly being configured to contact a ground service so as to prepare the soil. An auxiliary frame includes an upstanding front wall and a mounting arm extending rearwardly from the front wall, the auxiliary frame having at least one linking member having a first end pivotally coupled to the front wall and an opposed second end coupled to the primary frame adjacent a respective front edge of a respective side wall. An airbag includes a top coupled to the mounting arm and a bottom coupled to the at least one linking member via an airbag mounting bracket, the airbag being selectively inflated with air whereby to selectively apply a downward pressure to the assembly. The primary frame is raised or lowered by pivotal movement of the at least one linking member as the airbag is selectively inflated or deflated, respectively.

The strip-till row apparatus includes a mounting bracket extending upwardly and rearwardly from a cross brace connecting the side panels of the frame, the mounting bracket having a pair of spaced apart side walls and pair of spaced apart pins extending between the pair of side walls. An adjustment guide member includes opposed upper and lower ends and defining a plurality of adjustment holes adjacent the upper end, the guide member being positioned relative to the mounting bracket so as to move slidably between the pair of pins. The guide member includes a collar coupled to a selected hole of the guide member, the collar having a dimension larger than a space between the pair of pins so as to allow a selectable range of slidable travel of the guide member relative to the mounting bracket. Accordingly, the tillage assembly is operatively coupled to the lower end of the adjustment guide member so as to move up or down with the travel of the guide member.

Therefore, a general object of this invention is to provide a strip-till row apparatus for preparing soil for planting seeds.

Another object of this invention is to provide a strip-till row apparatus, as aforesaid, having an inflatable airbag mounted to a primary frame and configured to apply a selective amount of downward force according to a degree of inflation of the airbag.

Still another object of this invention is to provide a strip-till row apparatus, as aforesaid, having an adjustment guide member movably positioned relative to a mounting bracket and in communication with the tillage assembly and configured to "travel" as the tillage assembly is moved over uneven ground.

Yet another object of this invention is to provide a strip-till row apparatus, as aforesaid, having multiple types of tillage components designed to disrupt, condition, and smooth a soil surface in preparation for the planting of seeds.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 7a is a side view of the strip-till row apparatus as in FIG. 1 illustrated with the airbag in a substantially deflated configuration;

FIG. 7b is a side view of the strip-till row apparatus as in FIG. 1 illustrated with the airbag in a substantially inflated configuration;

FIG. 8b is a perspective view of the airbag as in FIG. 8a;

FIG. 9b is a perspective view of the airbag as in FIG. 9a;

FIG. 12a is a perspective view of a cultivating disk according to the present invention;

FIG. 12b is a side view of the cultivating disk as in FIG. 12a;

FIG. 20a is a perspective view from one angle of a fertilizer dispenser assembly taken from the apparatus as in FIG. 1; and FIG. 20b is perspective view from another angle of the fertilizer dispenser as in FIG. 20a.

DESCRIPTION OF THE PREFERRED EMBODIMENT

Figure 1:
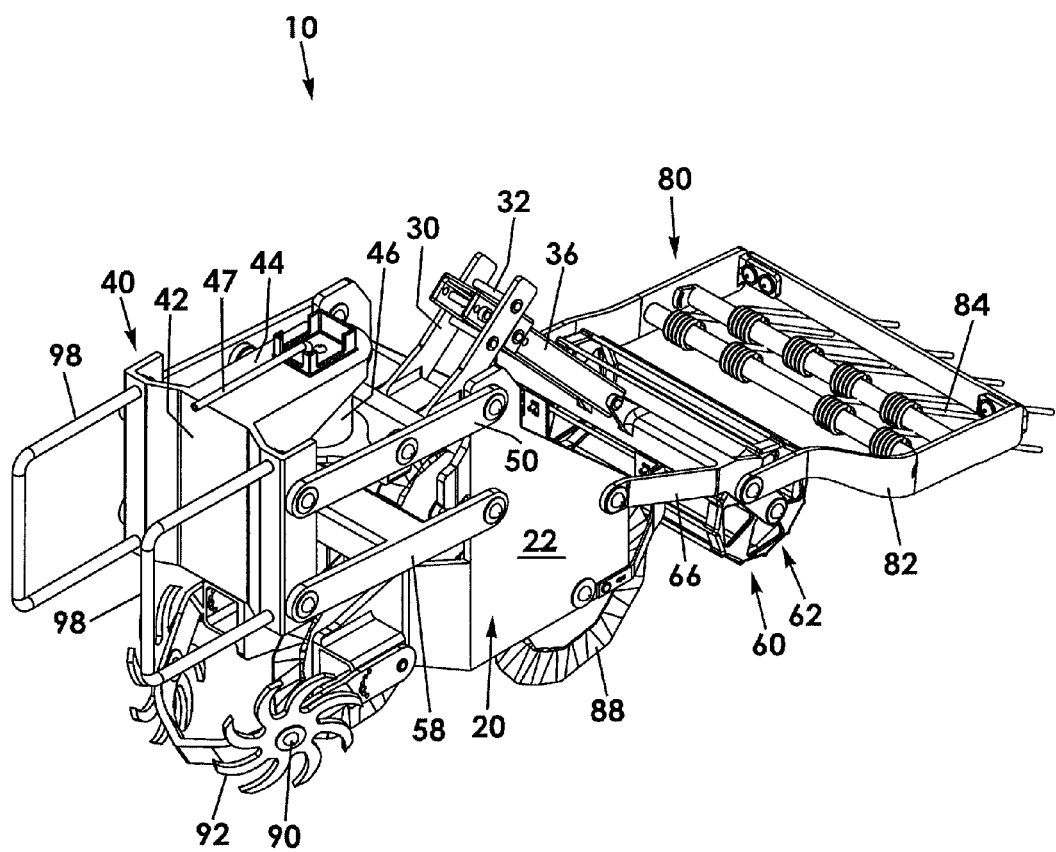
FIG. 1 is a front perspective view of a strip-till row apparatus according to a preferred embodiment of the present invention.
Figure 2:
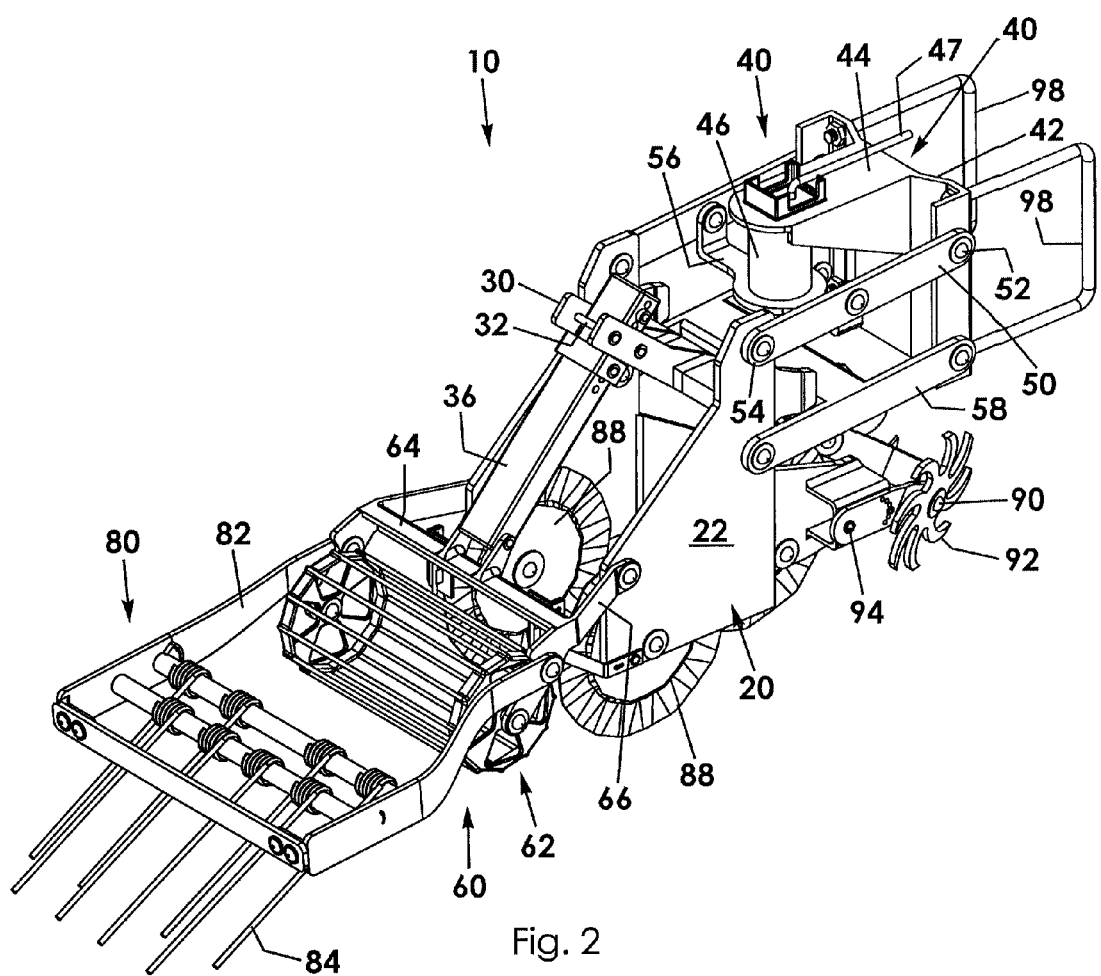
FIG. 2 is a rear perspective view of the strip-till row apparatus as in FIG. 1.

A strip-till row apparatus according to a preferred embodiment of the present invention will now be described with reference to FIGS. 1 to 20b of the accompanying drawings. The strip-till row apparatus 10 includes a primary frame 20, an auxiliary frame 40, a tillage assembly 60, and a selectively inflatable airbag 46 that provides an adjustable downward force on the tillage assembly 60 that engages the soil of a field.

Figure 3:
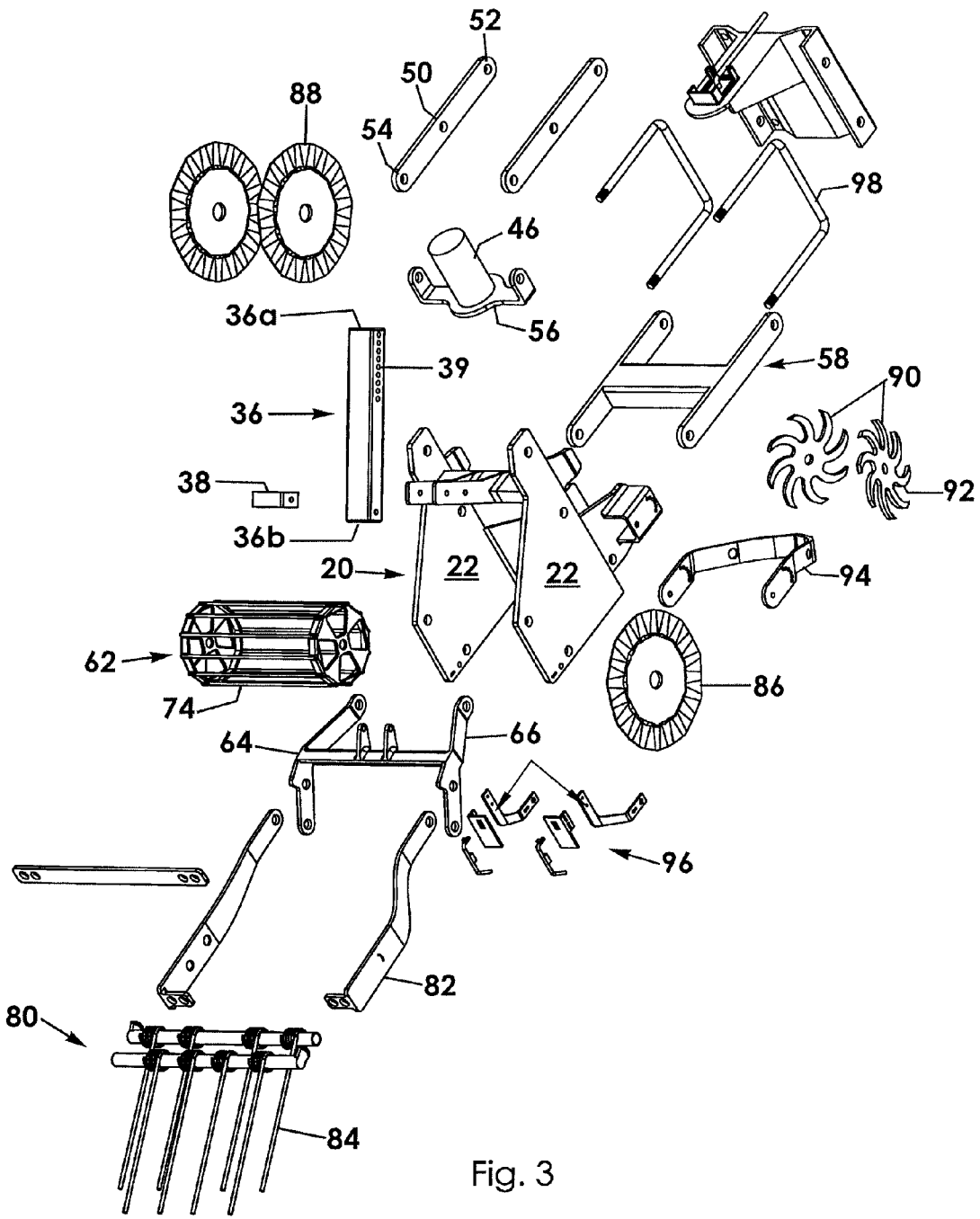
FIG. 3 is an exploded view of the strip-till row apparatus as in FIG. 2.
Figure 4:
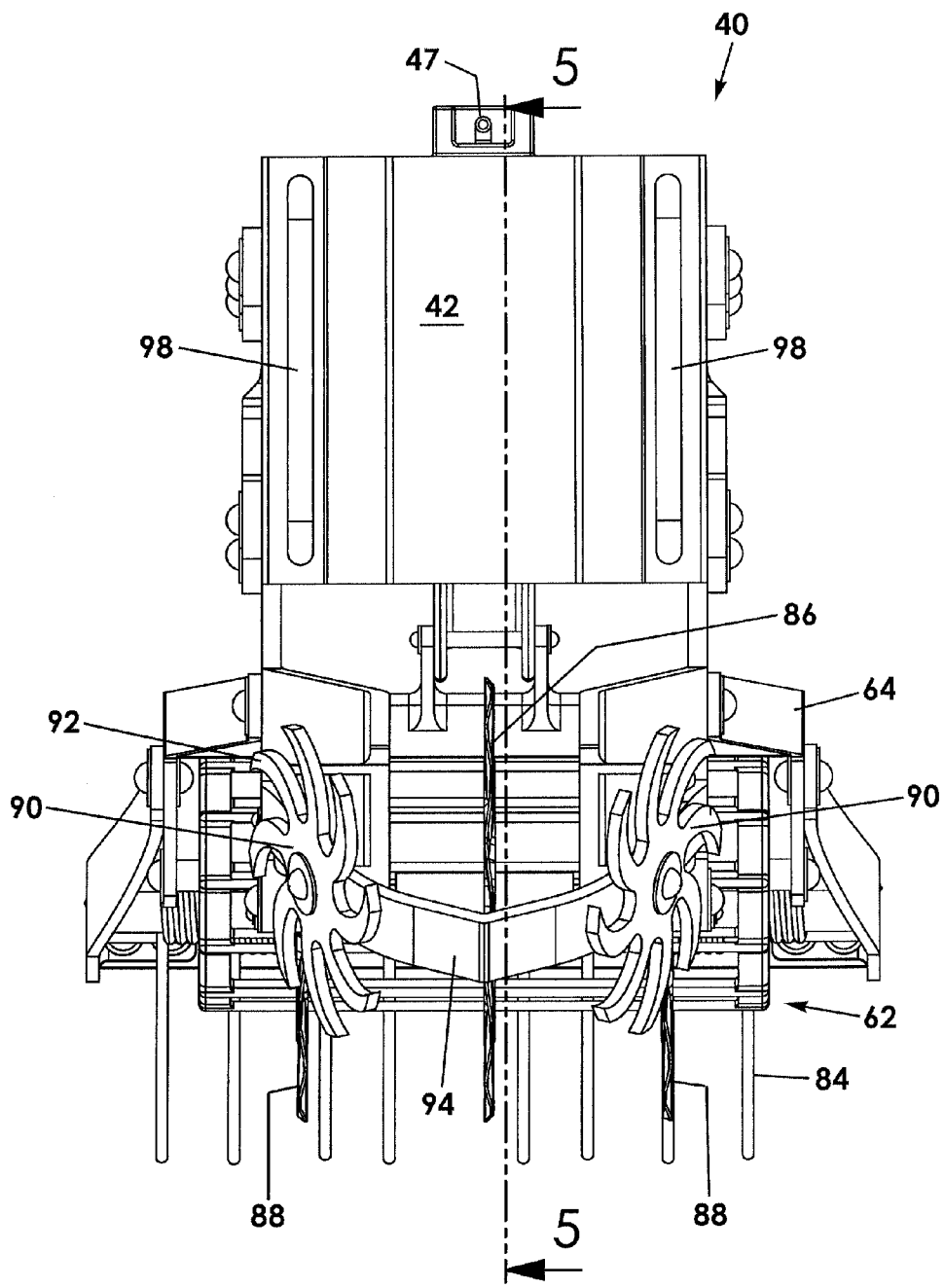
FIG. 4 is a front view of the strip-till row apparatus as in FIG. 1.
Figure 5:
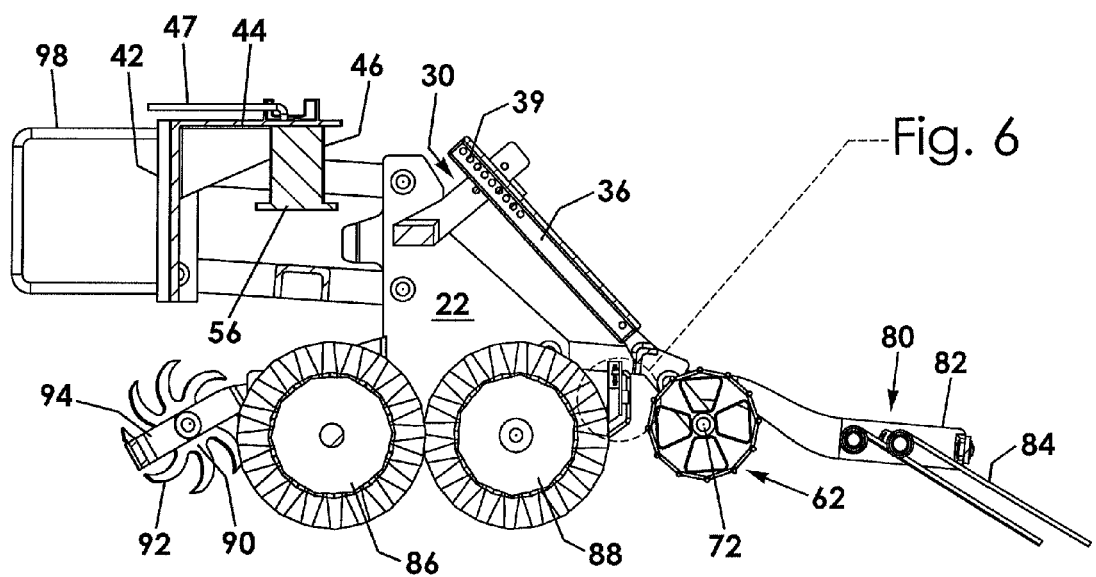
FIG. 5 is a sectional view taken along line 5-5 from FIG. 4.
Figure 6:
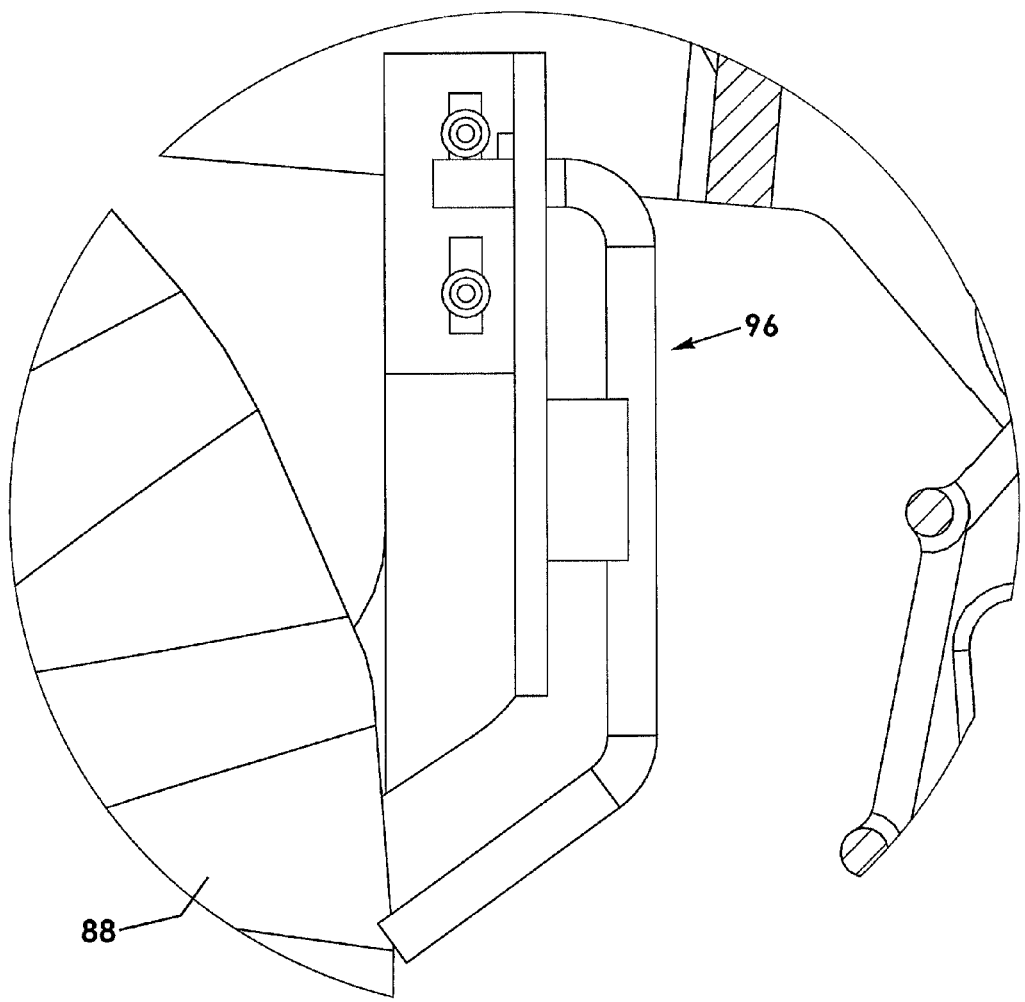
FIG. 6 is an isolated view on an enlarged scale taken from FIG. 5.
Figure 8A:
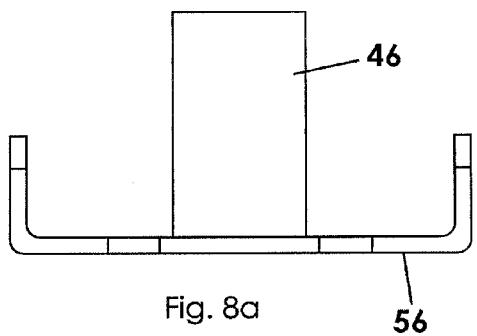
FIG. 8a is a side view of an airbag and airbag mounting bracket according to the present invention, illustrated in a substantially inflated configuration.
Figure 8B:
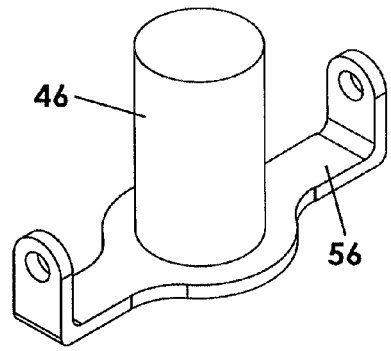
Figure 9A:
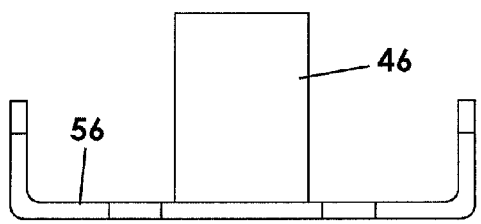
FIG. 9a is a side view of an airbag and airbag mounting bracket according to the present invention, illustrated in a substantially deflated configuration.
Figure 9B:
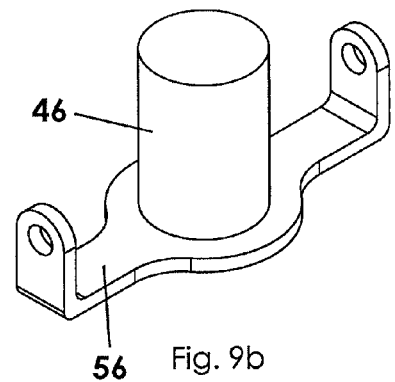
Figure 10:
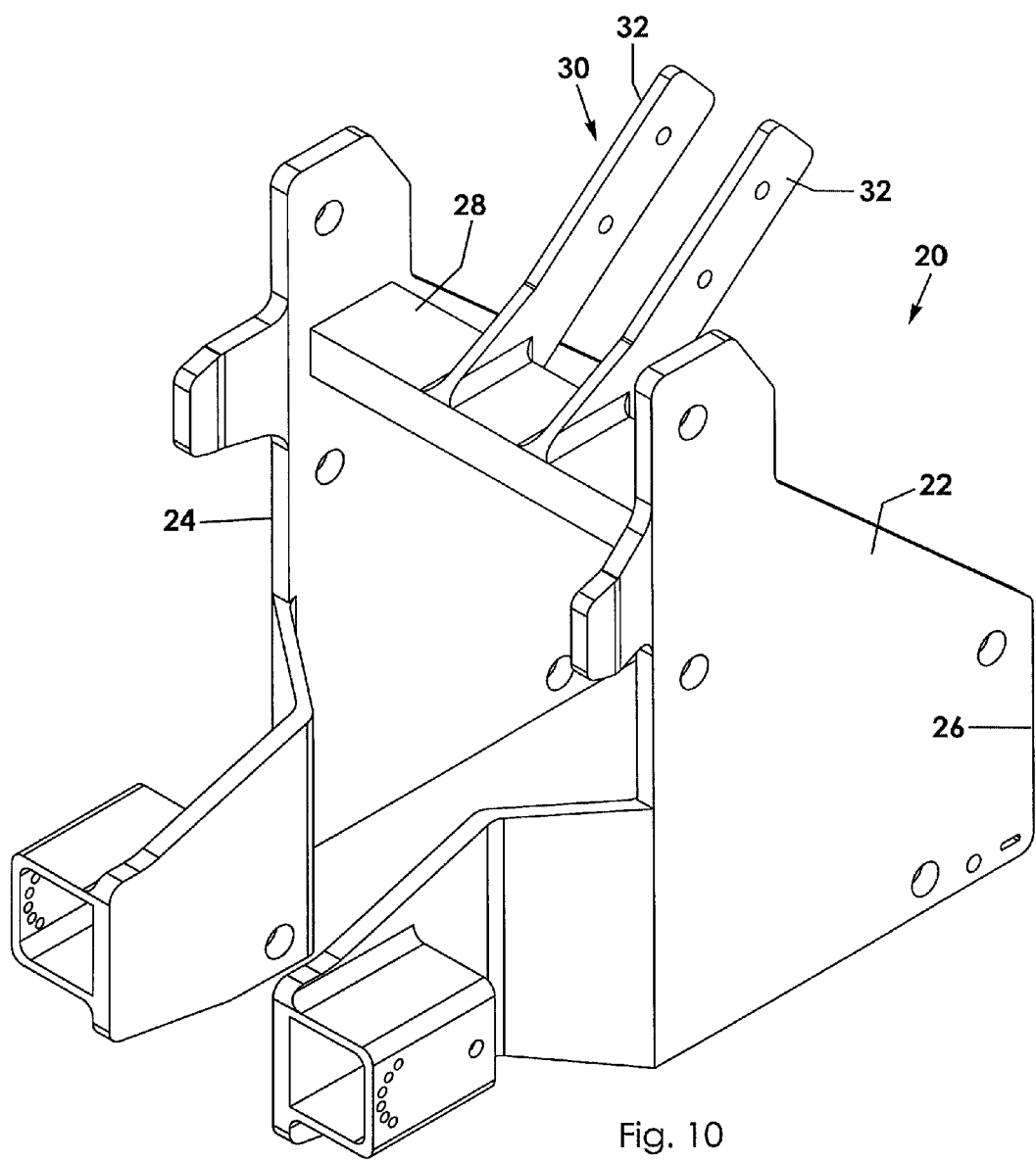
FIG. 10 is an isolated perspective view of a primary frame removed from the apparatus as in claim 1.
Figure 11:
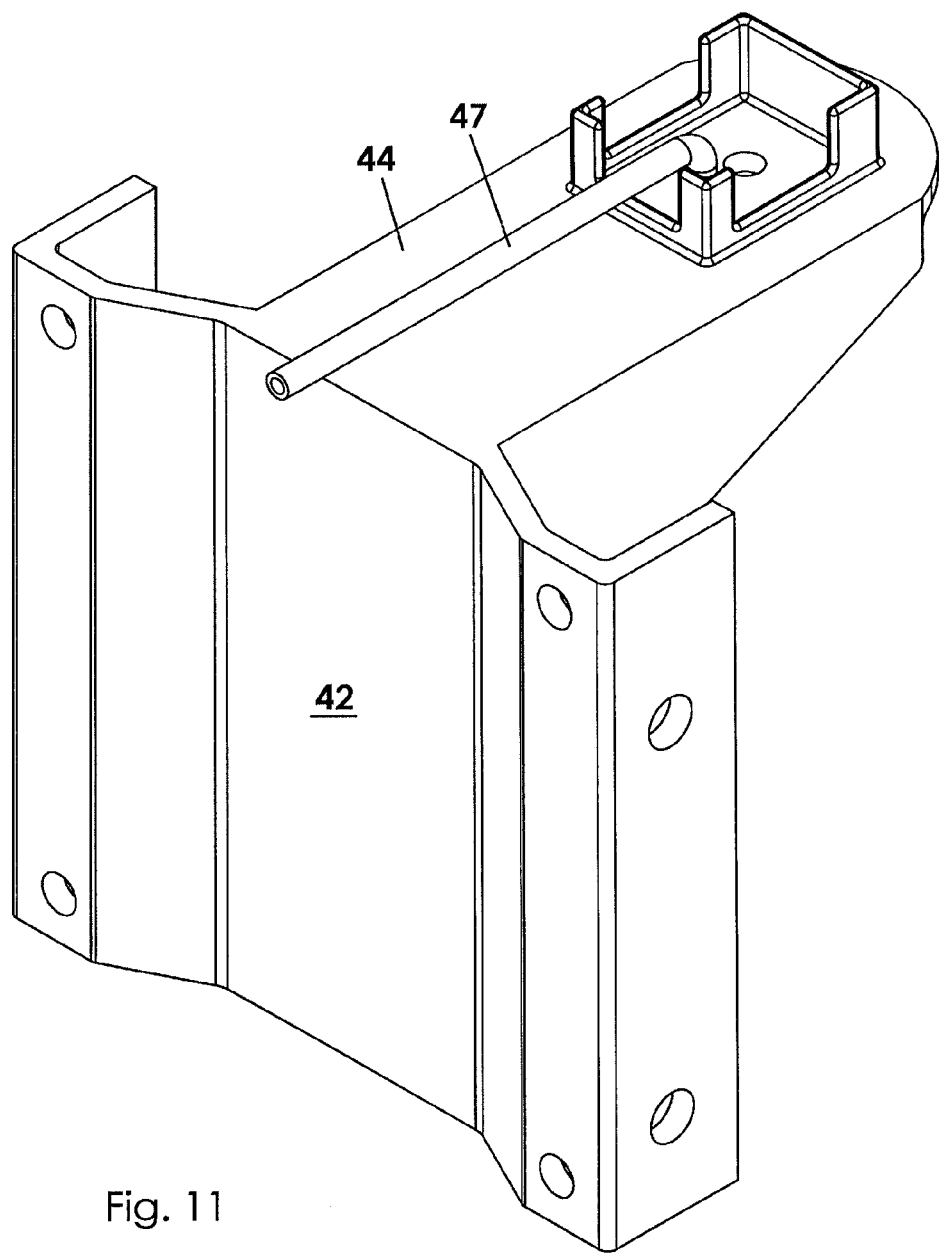
FIG. 11 is an isolated perspective view of an auxiliary frame removed from the apparatus as in claim 1.
Figure 13:
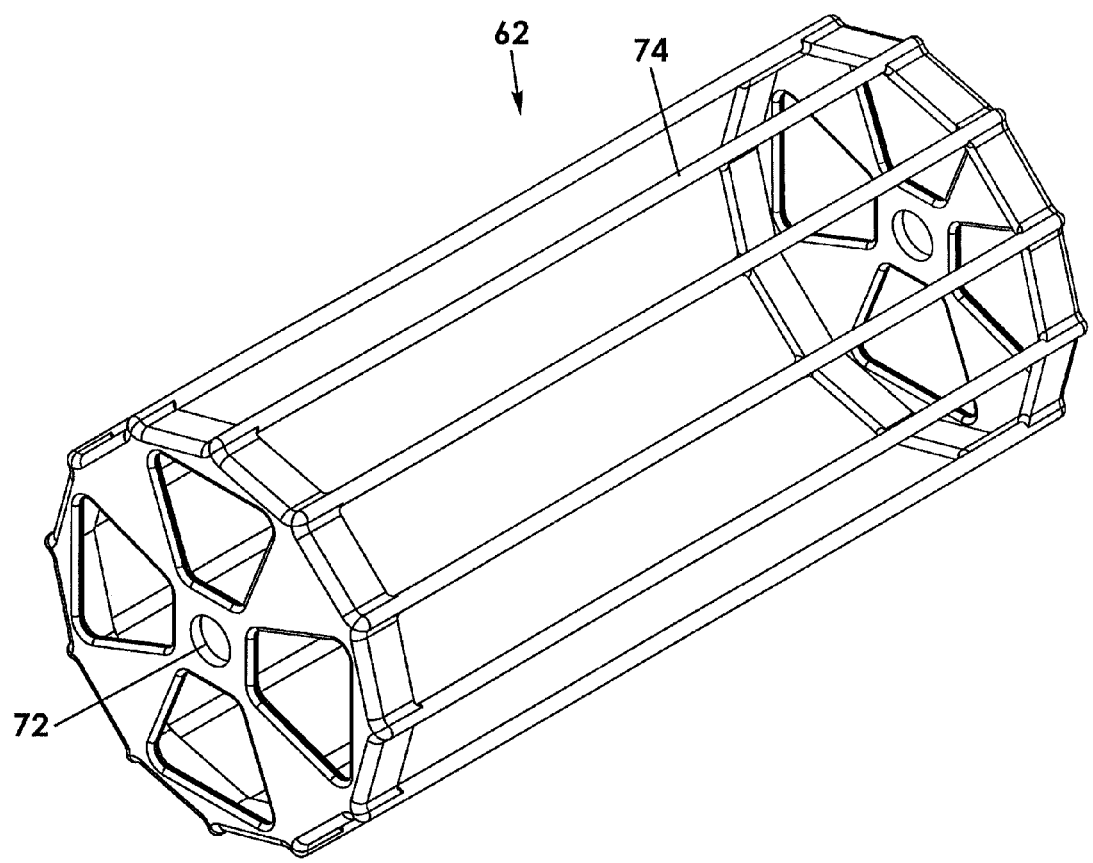
FIG. 13 is a perspective view of a rolling basket removed from the apparatus as in FIG. 1.
Figure 14:
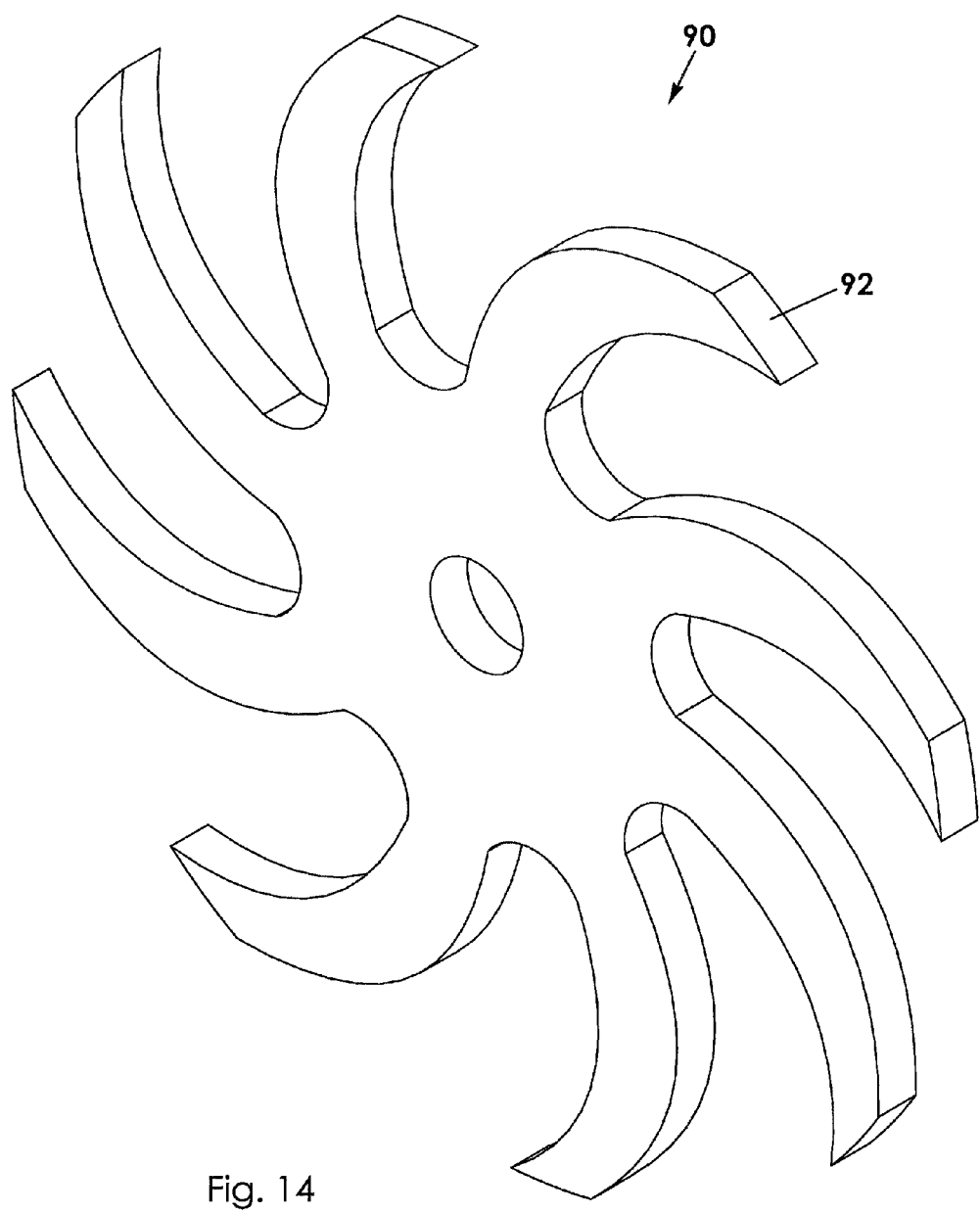
FIG. 14 is a perspective view of a residue management wheel removed from the apparatus as in FIG. 1.
Figures 15A, 15B:
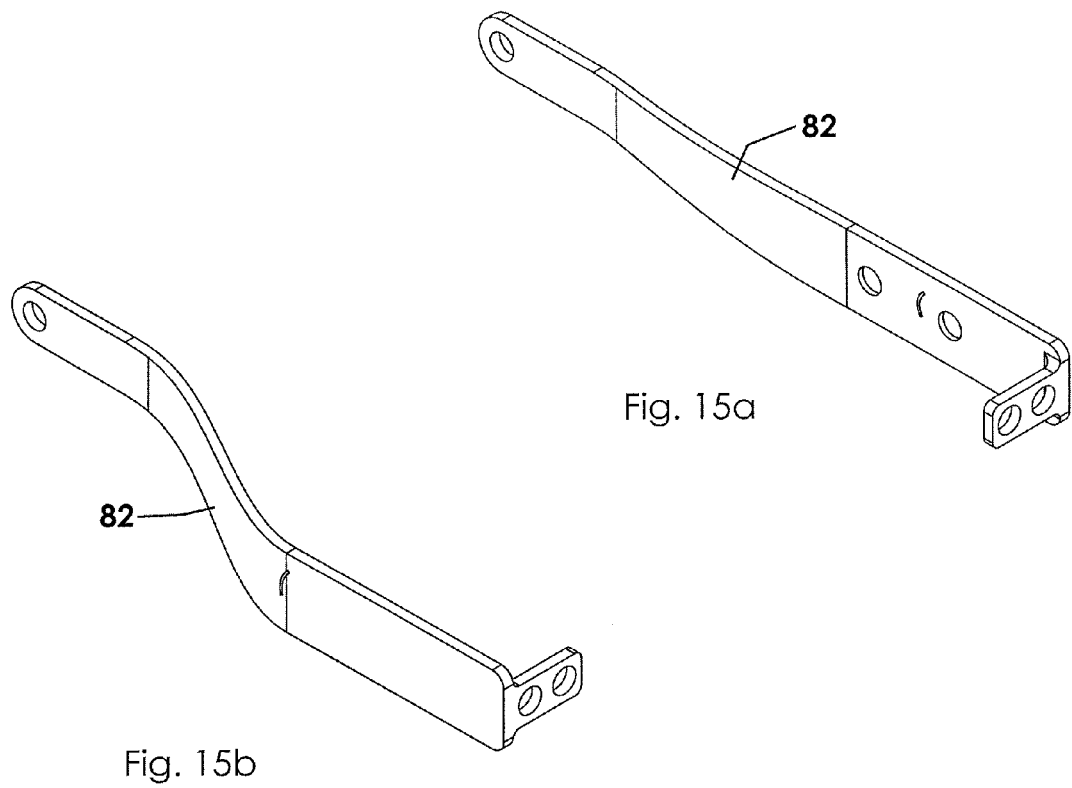
FIG. 15a is a mounting arm for mounting a harrow assembly to a tillage assembly as in FIG. 1.
FIG. 15b is another mounting arm for mounting a harrow assembly to a tillage assembly as in FIG. 1.
Figure 16:
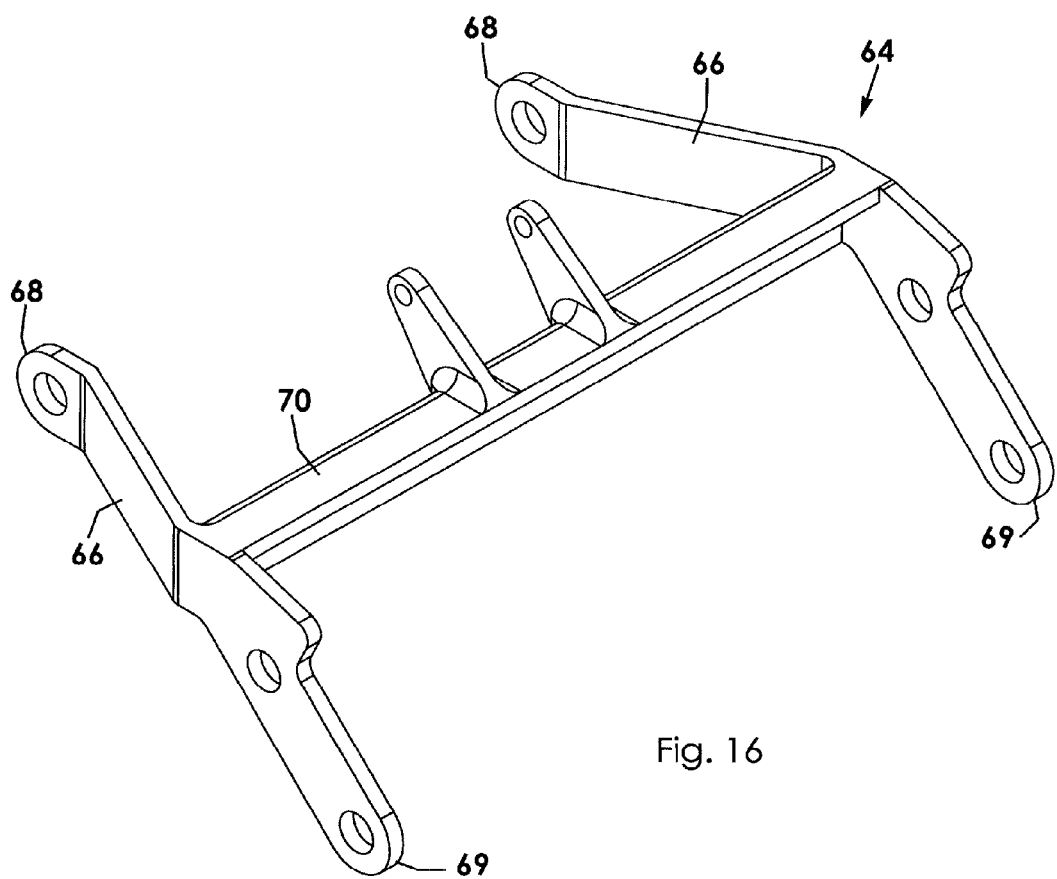
FIG. 16 is an isolated perspective view of a basket mounting bracket removed from the apparatus as in FIG. 1.
Figure 17:
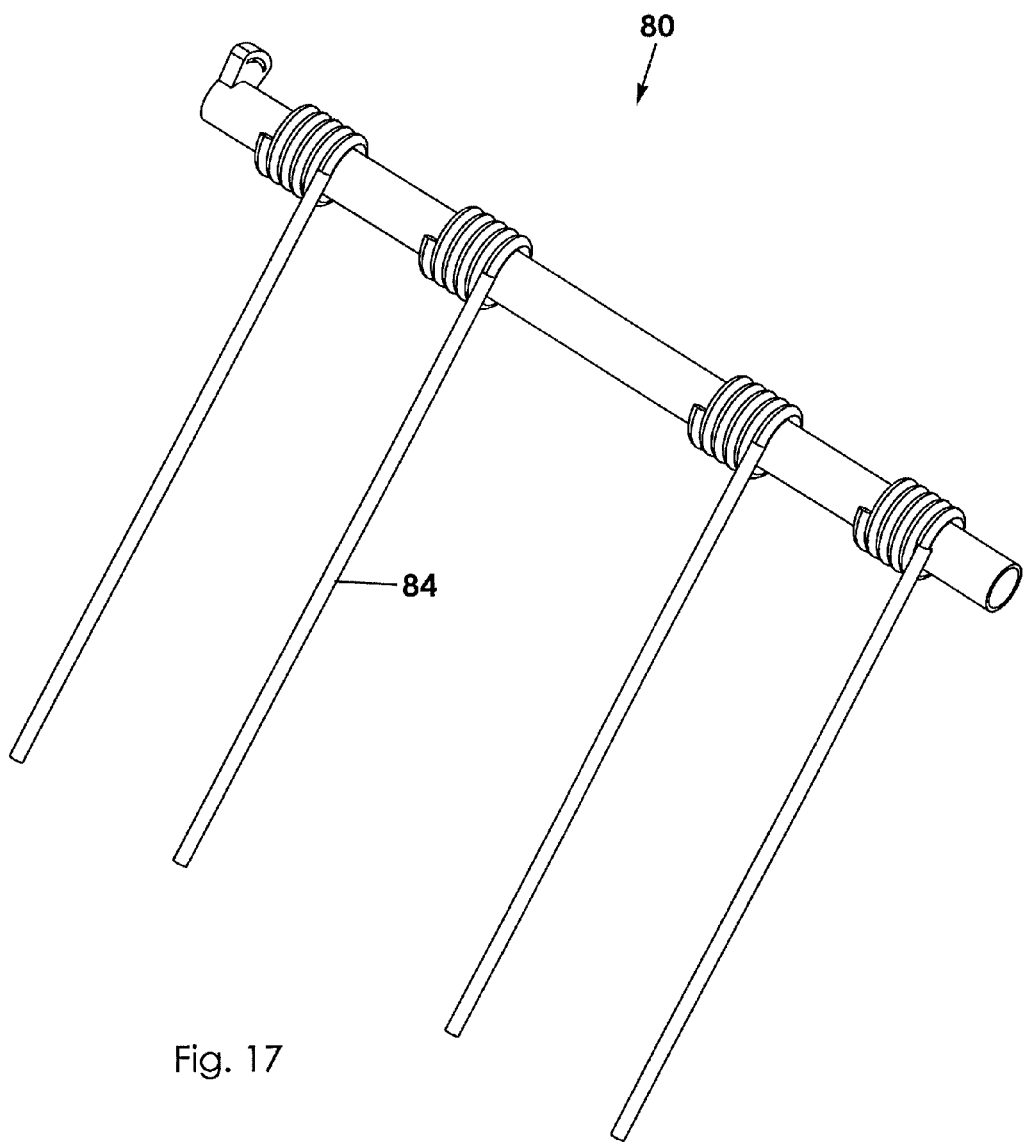
FIG. 17 is a perspective view of a harrow assembly removed from the apparatus as in FIG. 1.
Figures 18A, 18B:
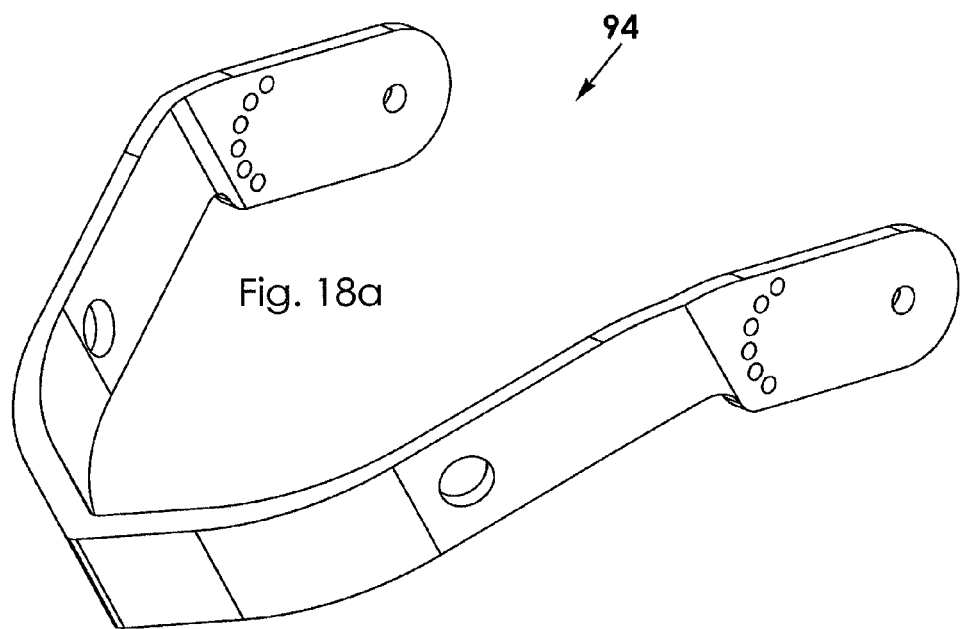
FIG. 18a is a perspective view of the mounting legs associated with a pair of residue management wheels.
Figure 19:
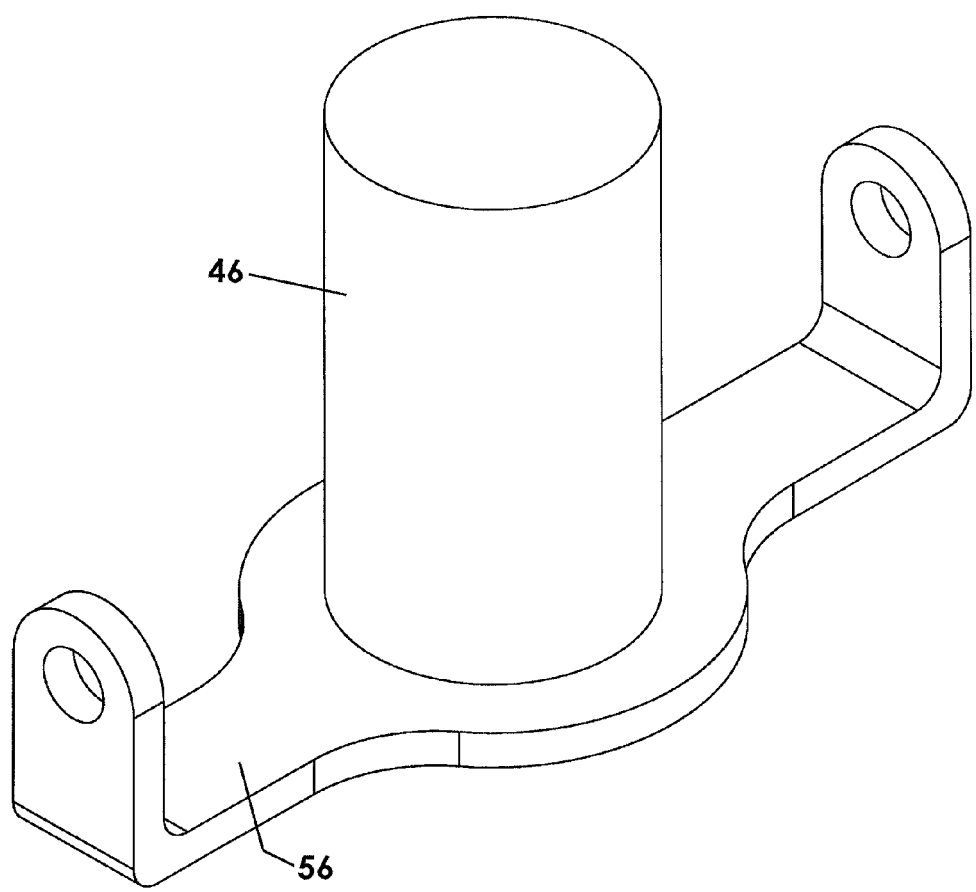
FIG. 19 is a perspective view on an enlarged scale of the airbag and airbag mounting bracket as in FIG. 8b.

The strip-till row apparatus 10 includes a primary frame 20 that includes a pair of upstanding side panels 22, each side panel 22 having an upstanding front edge 24 and opposed upstanding rear edge 26. The primary frame 20 includes a cross-brace 28 extending between the side panels 22. A mounting bracket 30 extends upwardly and rearwardly from the cross brace 28 and, in an embodiment, may be integrally constructed with the cross-brace 28. The mounting bracket 30 includes a pair of spaced apart side walls 32 and includes of spaced apart pins 34 extending between the pair of side walls 32 (FIGS. 3 and 10).

The strip-till row apparatus 10 includes an adjustment guide member 36 having an upper end 36a and an opposed lower end 36. The adjustment guide member 36 defines a plurality of holes 39 in linear succession adjacent the upper end 36a. The adjustment guide member 36 is positioned relative to the mounting bracket 30 so as to move slidably between the pair of pins 34. Movement of the adjustment guide member 36 relative to the mounting bracket 30 will be described in more detail later. The adjustment guide member 36 includes a collar 38 coupled to a selected hole 39 of the adjustment guide member 36. The collar 38 has a circumference that is larger than that of the space between the pair of pins 34 of the mounting bracket 30 so as to be a "stop" that limits the amount of slidable movement of the adjustment guide member under the pair of pins 34 of the mounting bracket 30. For instance, the adjustment guide member 36 may be movable between a lowered configuration in which the collar 38 is lowerly displaced from the pair of pins 34 and a raised configuration in which the collar 38 bears against (and is stopped by) the mounting bracket 30.

Movement of the adjustment guide member 36 occurs when the tillage assembly 60 bears against the lower end 36b of the adjustment guide member 36. Movement of the adjustment guide member 36 may be referred to as "travel" and the amount of "travel" is regulated by which hole 39 the collar 38 is coupled. The tillage assembly 60 is operatively coupled to the lower end 36b of the adjustment guide member 36 so as to move correspondingly up or down with the travel of the adjustment guide member 36. The tillage assembly 60 and its influence on movement of the adjustment guide member 36 will be described in greater detail later.

The strip-till row apparatus 10 includes an auxiliary frame 40 positioned forwardly of said primary frame 20, the auxiliary frame 40 having an upstanding front wall 42. A mounting arm 44 extends rearwardly from an upper edge of the front wall 42. The strip-till row apparatus 10 includes an inflatable airbag 46, the airbag 46 having a top coupled to the mounting arm 44 and a bottom coupled to an airbag mounting bracket 56. The auxiliary frame 40 includes at least one linking member that operatively couples the front wall 42 to the primary frame 20. In an embodiment, the auxiliary frame 40 includes a pair of upper linking members 50 and a pair of lower linking members 58. Each upper linking member 50 includes a first end 52 pivotally coupled to the front wall 42 of the auxiliary frame 40 and an opposed second end 54 coupled to the primary frame 20 adjacent a respective front edge of a respective side panel 22. In addition, each upper linking member 52 is coupled to the airbag 46 via an airbag mounting bracket 56. Similarly, each lower linking member 58 includes a first end 52 pivotally coupled to the front wall 42 of the auxiliary frame 40 and an opposed second end 54 coupled to the primary frame 20 adjacent a respective front edge of a respective side panel 22.

The airbag 46 may be selectively inflated with air or deflated. Specifically, the airbag 46 may be in fluid communication with an air compressor or other source of compressed air via a tube 47. For example, user control of air inflation may be situated in the cab of a tractor or other equipment. It is understood that as the airbag 46 is inflated, the airbag 46 puts downward pressure onto the pair of lower linking members 58. Respective first ends of respective linking members move pivotally as the linking members are urged downwardly. As a result, each linking member is urged to an increased rearwardly downward angle as the airbag is inflated. Accordingly, the primary frame 20 and tillage assembly 60 coupled thereto are maintained in position relative to the ground as the airbag 46 is inflated and is not allowed to travel up out of its position at a depth in the soil.

The tillage assembly 60 includes a rolling basket 62 coupled to the primary frame 20. More particularly, a basket mounting bracket 64 includes a pair of spaced apart mounting arms 66. Each mounting arm includes a front end 68 coupled to a respective side panel 22 of the primary frame 20 adjacent respective rear edges thereof and a rear end 69 rearwardly opposed from the front end 68.

Further, a support bar 70 extends between the mounting arms 66 and is coupled to the lower end of the adjustment guide member 36. The rolling basket 62 is coupled to respective rear ends of the mounting arms 66, the rolling basket 62 including opposed side walls having respective hubs 72 rotatably coupled to respective rear ends of respective mounting arms 66. The rolling basket further includes a plurality of rods 74 extending longitudinally between the side walls and defines open areas between the rods 74 that are configured so that soil is lifted by respective rods 74 into the interior space of the rolling basket 62 and deposited through the open areas back out of the interior space of the rolling basket 62.

It is understood that an upward force on the rolling basket 62 is transferred as an upward force on the adjustment guide member 36 which is situated to "travel" in a generally vertical motion. This configuration allows the rolling basket 62 to remain in enhanced and smoother communication with a soil surface. It is understood that inflation of the airbag 46 maintains a selected amount of downward force on the rolling basket 62 so that it maintains its position relative to the soil.

Further, the tillage assembly 60 includes a harrow assembly 80 having a harrow bracket 82 coupled to the primary frame 20 adjacent respective rear edges of respective side panels 22. More particularly, the harrow bracket 82 has an elongate construction and extends rearwardly away from the primary frame 20 and, preferably, rearward of the rolling basket 62. The harrow assembly 80 includes a plurality of horrow tines 84 coupled to and depending away from the harrow bracket 82. Each harrow tine 84 is spring biased in a downward direction so as to firmly penetrate a soil surface, thereby disrupting and smoothing the soil over which the harrow assembly 80 is dragged.

The tillage assembly 60 includes a plurality of cultivating disks, each disk having a generally circular configuration having a relatively sharp peripheral edge. More particularly, a primary cultivating disk 86 is rotatably coupled to the primary frame 20 and positioned along an imaginary longitudinal frame parallel with the side panels 22 of the primary frame 20. The primary cultivating disk 86 is positioned equally between the side panels 22, i.e. is centered therebetween. Further, a pair of side cultivating disks 88 are rotatably coupled to the primary frame 20. The side cultivating disks 88 have a vertical orientation and are parallel to the primary cultivating disk 86 and side panels 22. Each side cultivating disk 88 is preferably positioned adjacent an interior surface of a respective side panel 22.

Still further, the tillage assembly 60 includes a pair of residue management wheels 90 operatively mounted to the primary frame 20 proximate respective front edges of respective side panels 22. The pair of residue management wheels 90 are inwardly offset/angled relative to the side panels 22. In addition, each residue management wheel 90 includes a plurality of spaced apart teeth 92 each having an arcuate configuration configured to penetrate hard soil, vegetation, or other obstacles when being dragged across the ground. In an embodiment, a pair of height adjustable mounting legs 94 is coupled to and extend forwardly of respective front edges of respective side panels of the primary frame 20. The pair of residue management wheels 90 are rotatably coupled to free ends of respective mounting legs 94.

Further, the strip-till apparatus 10 may include a fertilizer dispensing assembly 96 operatively coupled to the primary frame 20 and configured to dispense a liquid fertilizer. The fertilizer dispensing assembly 96 may include a tube configured for fluid communication with a remote reservoir, such as a mobile tank (not shown) that may be pulled ahead of or behind the strip till apparatus 10.

A pair of mounting bars 98 may extend forwardly from the front wall 42 of the auxiliary frame 40, each mounting bar 98 being configured for selective attachment to a towing vehicle or apparatus. For instance, the bars 98 may be coupled to a tractor, to a larger framework operatively transporting or operating a plurality of strip-tillage units, a liquid fertilizer tank, or the like.

In use, the strip-till row apparatus 10 may be coupled independently to the rear of a tractor or in a larger assembly with other like devices. The airbag 46 may be inflated with air to a pressure or size as desired so as to impart a selected downward force upon the tillage assembly 60 and such that the tillage assembly will maintain its penetration to a desired depth in the soil when pulled over the ground. As the strip-till row apparatus 10 is pulled along, each component of the tillage assembly 60 engages the soil as described above so as to prepare it for later planting seeds. The inflation of the airbag 46 increases or decreases the the downward force upon the tillage assembly 60. The "travel" of the adjustment guide member 36 relative to the mounting bracket 30 enables the tillage assembly 60 to maintain a more consistent and smooth contact with the soil as described above.

It is understood that while certain forms of this invention have been illustrated and described, it is not limited thereto except insofar as such limitations are included in the following claims and allowable functional equivalents thereof.

The invention claimed is:

1. A strip-till row apparatus for preparing soil for planting, comprising:
   a primary frame having a pair of spaced apart side panels, each side panel having a generally upstanding front edge and an opposed upstanding rear edge, said primary frame having a cross brace extending between said pair of side panels;
   a tillage assembly operatively coupled to said primary frame adjacent said rear edges thereof, said tillage assembly being configured to contact a ground service so as to prepare the soil;
   an auxiliary frame having an upstanding front wall and a mounting arm extending rearwardly from said front wall, said auxiliary frame having at least one linking member having a first end pivotally coupled to said front wall and an opposed second end coupled to said primary frame adjacent a respective front edge of a respective side panel;
   an airbag having a top coupled to said mounting arm and a bottom coupled to said at least one linking member via an airbag mounting bracket, said airbag being selectively inflated with air;
   wherein said primary frame is raised or lowered by pivotal movement of said at least one linking member as said airbag is selectively inflated or deflated, respectively;
   a mounting bracket extending upwardly and rearwardly from said cross brace, said mounting bracket having a pair of spaced apart side walls and pair of spaced apart pins extending between said pair of side walls; and
   an adjustment guide member having opposed upper and lower ends and defining a plurality of adjustment holes adjacent said upper end, said guide member being positioned relative to said mounting bracket so as to move slidably between said pair of pins;
   wherein said guide member includes a collar coupled to a selected hole of said guide member, said collar having a dimension larger than a space between said pair of pins so as to allow a selectable range of slidable travel of said guide member relative to said mounting bracket;
   wherein said tillage assembly is operatively coupled to said lower end of said adjustment guide member so as to move up or down with said travel of said guide member.

2. The strip-till row apparatus as in claim 1, wherein said at least one linking member is urged to an increased rearwardly downward angle as said airbag is inflated, said tillage assembly being lowered as said primary frame is lowered by said increased rearwardly downward angle of said linking member.

3. The strip-till row apparatus as in claim 1, wherein said airbag is in fluid communication with an air source remote from said auxiliary frame via an air tube.

4. The strip-till row apparatus as in claim 1, further comprising a pair of mounting bars coupled to a front surface of said front wall of said auxiliary frame.

5. The strip-till row apparatus as in claim 1, wherein said at least one linking member includes:
   a pair of upper linking members, each upper linking member having a first end pivotally coupled to said front wall of said auxiliary frame, each upper linking member being coupled to said airbag, wherein a rearwardly downward angle of said pair of upper linking members is increased upon an increase in inflation of said airbag; and
   a pair of lower linking members, each lower linking member having a first end pivotally coupled to said front wall of said auxiliary frame.

6. The strip-till row apparatus as in claim 1, wherein said tillage assembly includes:
   a rolling basket coupled to said primary frame, said rolling basket having opposed side walls having hubs rotatably coupled to respective side panels of said primary frame adjacent rear edges thereof;
   wherein said rolling basket includes a plurality of rods extending longitudinally between said side walls and defining open areas between adjacent rods so that soil is lifted by respective rods and deposited through respective open areas.

7. The strip-till row apparatus as in claim 1, wherein said tillage assembly includes:
   a basket mounting bracket having a pair of spaced apart mounting arms, each mounting arm having a front end coupled to a respective side panel of said primary frame adjacent respective rear edges and a rear end rearwardly opposed to said front end, said basket mounting bracket having a support bar extending between said mounting arms that is coupled to said lower end of said adjustment guide member;
   a rolling basket coupled to respective rear ends of said mounting arms, said rolling basket having opposed side walls having hubs rotatably coupled to respective rear ends of said mounting arm;
   wherein said rolling basket includes a plurality of rods extending longitudinally between said side walls and defining open areas between adjacent rods so that soil is lifted by respective rods and deposited through respective open areas;
   wherein an upward force urged against said rolling basket urges said adjustment guide member to travel relative to said mounting bracket.

8. The strip-till apparatus as in claim 7, wherein said tillage assembly includes a harrow assembly having a harrow bracket coupled to said primary frame adjacent said rear edges and extending away therefrom and rearwardly of said rolling basket, said harrow assembly having a plurality of spaced apart harrow tines depending from said harrow bracket.

9. The strip-till apparatus as in claim 8, wherein each harrow tine is spring biased in a downward direction configured to disrupt and prepare the soil for planting.

10. The strip-till apparatus as in claim 1, further comprising:
    a primary cultivating disk rotatably coupled to said primary frame and positioned centered between said side panels thereof;
    a pair of said side cultivating disks rotatably coupled to said primary frame adjacent inside surfaces of respective side panels;
    wherein said primary cultivating disk and said pair of side cultivating disks have a vertical origination and parallel to said side panels of said primary frame.

11. The strip-till apparatus as in claim 1, further comprising:
    a pair of residue management wheels operatively mounted to said primary frame proximate said front edges of said side walls, said pair of residue management wheels being positioned at inwardly offset angles relative to said side walls;
    wherein each residue management wheel having a plurality of arcuate teeth.

12. The strip-till apparatus as in claim 11, comprising a pair of height adjustable mounting legs extending forwardly from respective front edges of respective side panels of said primary frame, said pair of residue management wheels being rotatably coupled to free ends of respective mounting legs.

13. The strip-till apparatus as in claim 1, comprising a fertilizer dispensing assembly operatively coupled to said primary frame, said fertilizer dispensing assembly having a tube configured for fluid communication with a remote reservoir.

14. The strip-till apparatus as in claim 1, further comprising:
    a primary cultivating disk rotatably coupled to said primary frame and positioned centered between said side panels thereof;
    a pair of said side cultivating disks rotatably coupled to said primary frame adjacent inside surfaces of respective side panels;
    wherein said primary cultivating disk and said pair of side cultivating disks have a vertical origination and parallel to said side panels of said primary frame.

* * * * *